United States Patent [19]

Hisanaga et al.

[11] Patent Number: 5,485,150
[45] Date of Patent: Jan. 16, 1996

[54] REMOTE DATA READ SYSTEM

[75] Inventors: Tetsuo Hisanaga; Tetsuya Kajita, both of Kanagawa, Japan

[73] Assignee: Yamatake-Honeywell Co., Ltd., Tokyo, Japan

[21] Appl. No.: 956,797

[22] Filed: Oct. 5, 1992

[30] Foreign Application Priority Data

Oct. 7, 1991 [JP] Japan ..................... 3-285465

[51] Int. Cl.$^6$ .............. G08B 23/00; G08C 15/06
[52] U.S. Cl. .................. 340/870.02; 340/870.08
[58] Field of Search .............. 340/870.02, 870.03, 340/870.08, 870.11, 870.31, 870.32, 825.31, 825.34, 825.52, 825.54, 825.44, 539; 455/254, 63, 127, 95; 324/142

[56] References Cited

U.S. PATENT DOCUMENTS

| | | | |
|---|---|---|---|
| 3,656,112 | 4/1972 | Paull | 340/870.02 |
| 4,463,354 | 7/1984 | Sears | 340/870.02 |
| 4,758,836 | 7/1988 | Sculli | 340/870.02 |
| 4,782,341 | 11/1988 | Gray | 340/870.02 |
| 5,252,967 | 10/1993 | Brennan et al. | 340/870.02 |
| 5,270,704 | 12/1993 | Sosa Quintana et al. | 340/870.02 |
| 5,278,551 | 1/1994 | Wakatsuki et al. | 340/870.02 |
| 5,289,459 | 2/1994 | Brownlie | 455/127 |

FOREIGN PATENT DOCUMENTS

| | | | |
|---|---|---|---|
| 0460734 | 12/1991 | European Pat. Off. | G01R 21/133 |
| 2138609 | 10/1984 | United Kingdom | G01F 15/06 |
| 2222898 | 3/1990 | United Kingdom | G06F 15/22 |
| 2230629 | 10/1990 | United Kingdom | G06M 1/272 |

*Primary Examiner*—Michael T. Razavi
*Assistant Examiner*—Tuan V. Ho
*Attorney, Agent, or Firm*—Blakely, Sokoloff, Taylor & Zafman

[57] ABSTRACT

A remote data read system includes a plurality of accumulators including first transmission/reception sections of an electromagnetic induction type, and a handy terminal including a second transmission/reception section of an electromagnetic induction type. The plurality of accumulators accumulate accumulation values representing amounts of consumed power, gas, tap water, or the like, and output accumulated value data in response to data request signals transmitted thereto. The first transmission/reception sections receive external data request signals, and output accumulation value data in response to the data request signal. The handy terminal outputs the data request signal to read an accumulation value from the accumulator and displays input accumulation value data. The second transmission/reception section outputs the data request signal to the first transmission/reception section, and receives the accumulation value data output from the first transmission/reception section.

4 Claims, 4 Drawing Sheets

REMOTE DATA READ SYSTEM

BACKGROUND OF THE INVENTION

The present invention relates to a remote data read system for reading data from an accumulator in a noncontacting manner.

An accumulator for accumulating the amount of consumed power, gas, tap water, or the like is installed in each home. When such consumed amount is to be checked, a meterman visits each home every month, reads an accumulation amount (data) displayed on a display unit such as a meter or a counter of the accumulator, and records the read data.

If an accumulator of this type is installed at a dark place or a narrow place which inhibits the meterman from approaching the accumulator, it is difficult for the meterman to accurately read an accumulation amount, resulting in causing a reading or recording error or requiring much time to read.

SUMMARY OF THE INVENTION

It is an object of the present invention to provide a remote data read system which is capable of improving precision in reading data from each accumulator.

It is another object of the present invention to provide a remote data read system which permits accumulators to be installed in any place.

In order to achieve the above objects, according to the present invention, there is provided a remote data read system comprising a plurality of accumulators each for accumulating data representing an amount under measurement, each the accumulator including first transmission/reception means of an electromagnetic induction type for receiving a data request signal, and outputting data representing accumulated amount in response to the data request signal, and a hand-held/portable terminal for reading and displaying data from the accumulator, the hand-held/portable terminal including second transmission/reception means of an electromagnetic induction type for outputting the data request signal to the first transmission/reception means, and receiving the data representing accumulated amount from the first transmission/reception means.

DESCRIPTION OF THE PREFERRED EMBODIMENT

Figure 1:
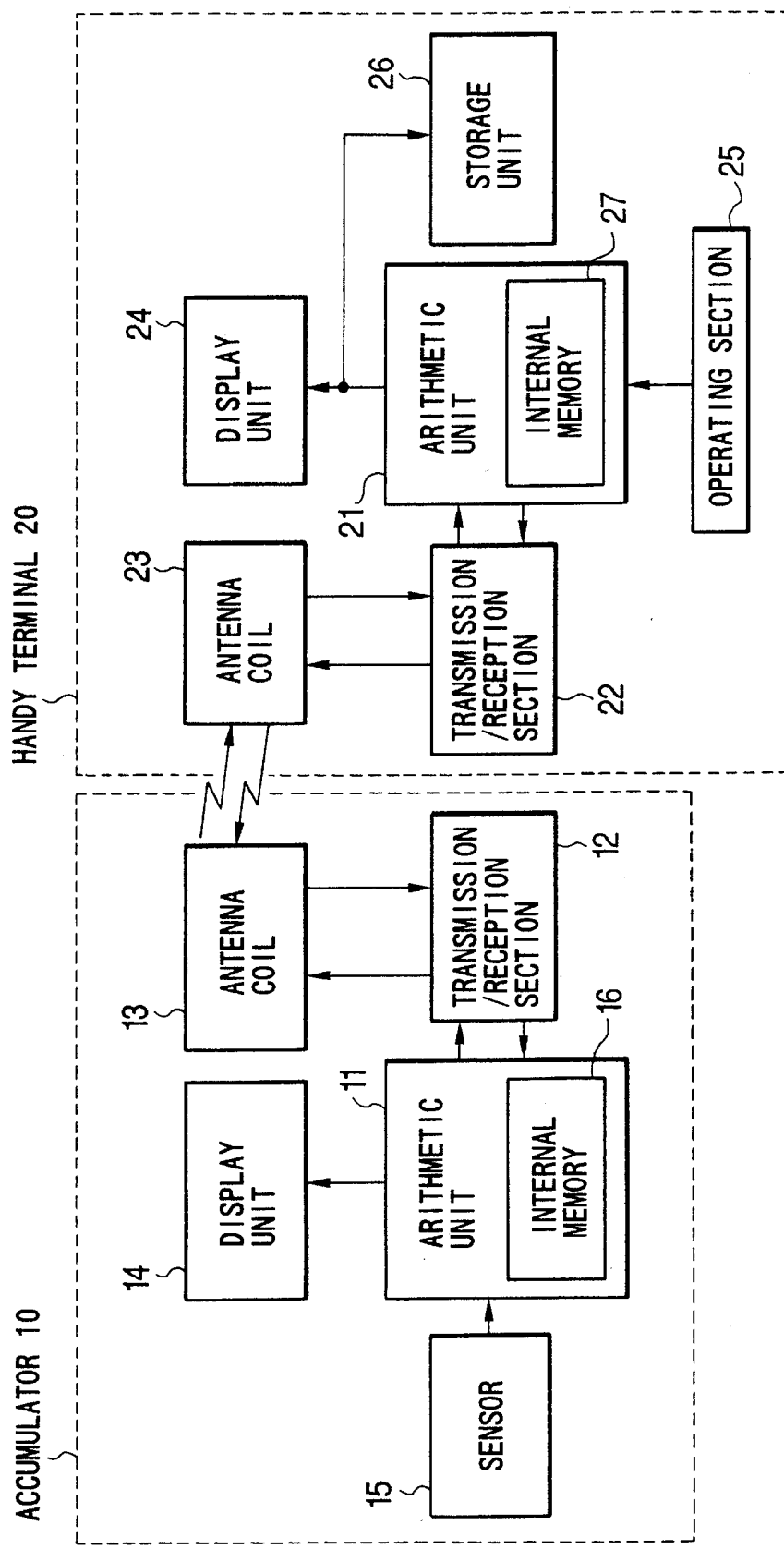
FIG. 1 is a block diagram showing a remote data read system according to an embodiment of the present invention.

The present invention will be described below with reference to the accompanying drawings. FIG. 1 shows a remote data read system according to an embodiment of the present invention.

Referring to FIG. 1, reference numeral 10 denotes an accumulator installed, e.g., in each home and designed to accumulate the amount of consumed power, gas, tap water, or the like; and 20, a hand-held/portable terminal for receiving data from the accumulator 10 and displaying it. The accumulator 10 comprises an arithmetic unit 11 having an internal memory 16, a transmission/reception section 12, an antenna coil 13, a display unit 14, and a sensor 15. The hand-held/portable terminal 20 comprises an arithmetic unit 21 having an internal memory 27, a transmission/reception section 22, an antenna coil 23, a display unit 24, and an operating section 25.

In the accumulator 10, the sensor 15 is designed to sequentially detect the amount of consumed power and transmit the data to the arithmetic unit 11, which in turn accumulates and stores it. In addition, the arithmetic unit 11 displays the accumulation amount on the display unit 14.

When an operator brings the hand-held/portable terminal 20 close to the accumulator 10 and operates the operating section 25 of the hand-held/portable terminal 20 to read out the accumulation value data from the accumulator 10, the corresponding operation signal is transmitted to the arithmetic unit 21. The arithmetic unit 21 transmits a data request signal based on this operation signal to the accumulator 10 through the transmission/reception section 22 and the antenna coil 23. In the accumulator 10, the data request signal transmitted from the hand-held/portable terminal 20 is received by the transmission/reception section 12 through the antenna coil 13, and the received data is input to the arithmetic unit 11. As a result, the data representing the accumulation value such as the amount of consumed power, which is accumulated and stored in the arithmetic unit 11, is transmitted to the hand-held/portable terminal 20 through the transmission/reception section 12 and the antenna coil 13. In the hand-held/portable terminal 20, the accumulation value data transmitted from the accumulator 10 is received by the transmission/reception section 22 through the antenna coil 23, and is input to the arithmetic unit 21, and the received data is displayed on the display unit 24. At the same time, the data output to the display unit 24 is stored in a storage unit 26 to be used for a data totaling operation.

Figure 2:
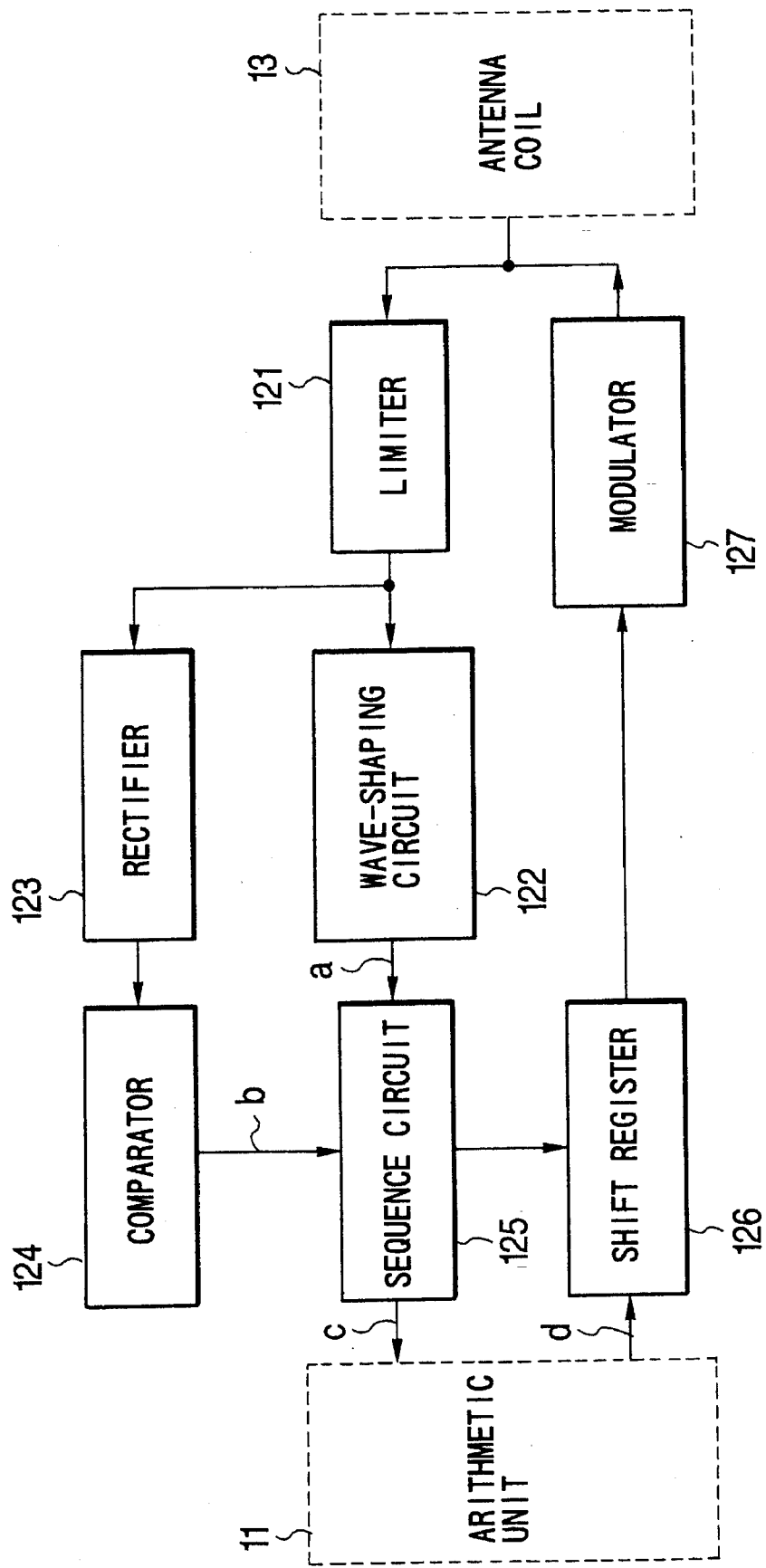
FIG. 2 is a block diagram showing a transmission/reception section in an accumulator constituting the system.

FIG. 2 shows a main part of the present invention, specifically the transmission/reception section 12 in the accumulator 10. Referring to FIG. 2, reference numeral 121 denotes a limiter; 122, a wave-shaping circuit; 123, a rectifier; 124, a comparator; 125, a sequence circuit; 126, a shift register; and 127, a modulator. Reference symbol a denotes a clock signal; b, a start signal; c, a data request signal; and d, a data signal.

Figure 3:
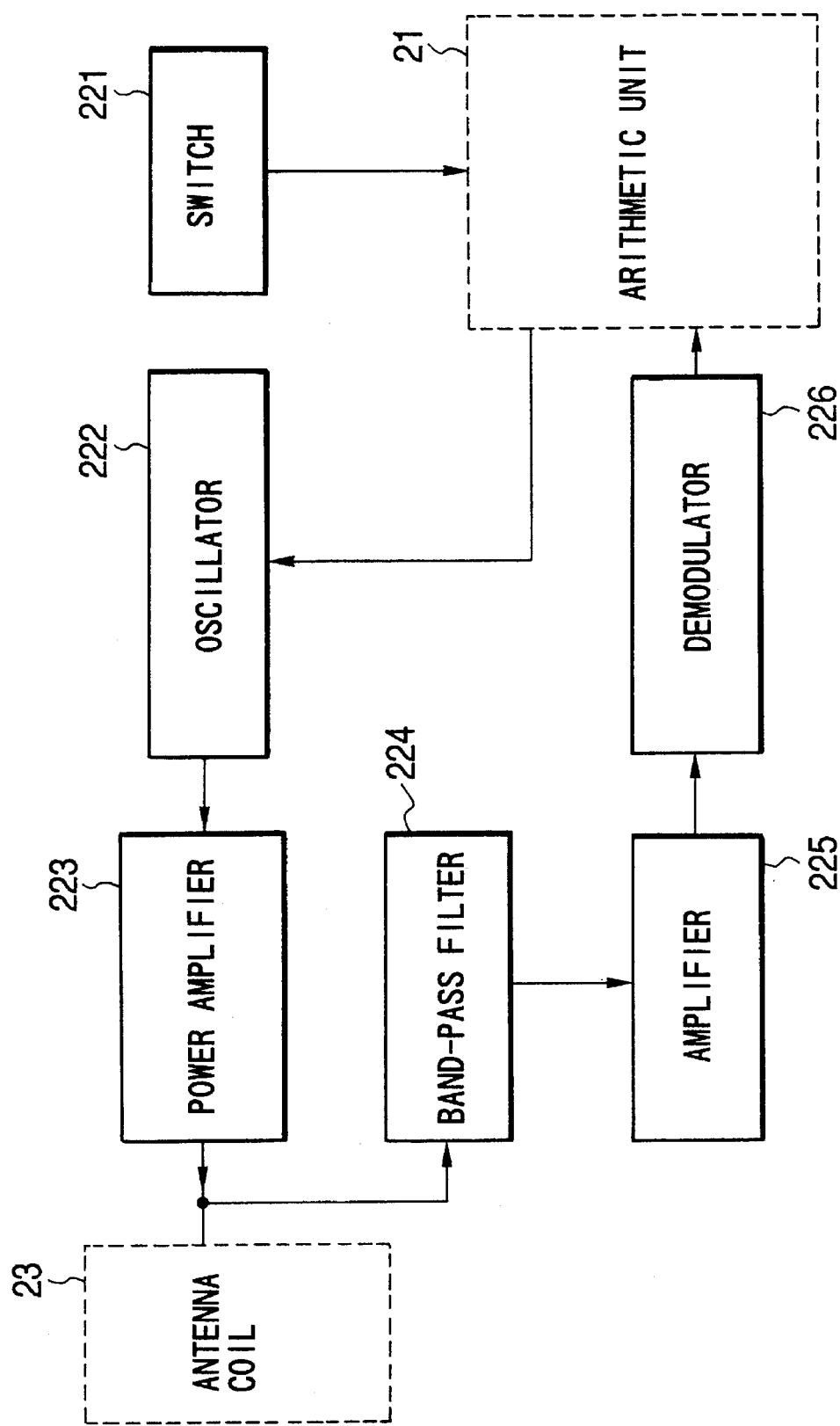
FIG. 3 is a block diagram showing a transmission/reception section in a hand-held/portable terminal constituting the system.

FIG. 3 shows the transmission/reception section 22 in the hand-held/portable terminal 20. Referring to FIG. 3, reference numeral 221 denotes a switch; 222, an oscillator for generating a carrier signal at a frequency $f_1$; 223, a power amplifier; 224, a band-pass filter; 225, an amplifier; and 226, a demodulator.

Figure 4A:
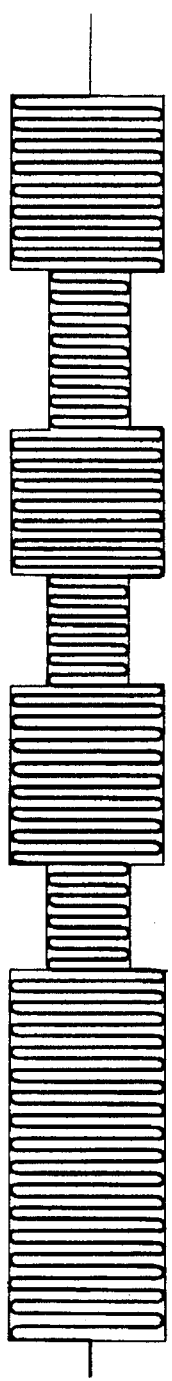
FIGS. 4A and 4B are charts, respectively, showing the waveforms of signals to be transmitted in the system.

Operations of the circuits shown in FIGS. 2 and 3 will be described below with reference to the signal waveform charts in FIGS. 4A and 4B.

When the switch 221 in the hand-held/portable terminal 20 is operated, a carrier at the frequency $f_1$ is generated by the oscillator 222 in accordance with an output from the arithmetic unit 21. This carrier is transmitted to the accumulator 10 through the power amplifier 223 and the antenna coil 23. When a voltage is induced in the antenna coil 13 of the accumulator 10 by the transmission carrier, the induced voltage signal is shaped by the wave-shaping circuit 122 through the limiter 121 to be formed into the clock signal a. The clock signal a is then supplied to the sequence circuit 125. Meanwhile, the induced voltage signal is rectified by the rectifier 123, and its amplitude is compared with a predetermined level by the comparator 124. If the amplitude is equal to or higher than the predetermined level, the start signal b is sent to the sequence circuit 125.

Upon reception of the start signal b and the clock signal a, the sequence circuit 125 determines that a data request is made by the hand-held/portable terminal 20, and supplies the data request signal c to the arithmetic unit 11. Consequently, as described above, the accumulation value data signal d representing the accumulation amount of consumed power, gas, tap water, or the like, which is stored in the arithmetic unit 11, is output to the transmission/reception section 12. More specifically, the accumulation value data signals d output from the arithmetic unit 11 are sequentially stored in the shift register 126. The data signals d accumulated in the shift register 126 are read out bit by bit by the modulator 127. The modulator 127 performs amplitude modulation shown in FIG. 4A with respect to the voltage signal induced in the antenna coil 13 on the basis of the read data, and transmits the resultant signal to the hand-held/portable terminal 20. In this case, the transfer rate of modulation is set to be $f_{1M}$, and the amplitude of the voltage signal is left to a certain degree to allow extraction of the clock signal a in modulation.

In the hand-held/portable terminal 20, when a signal component having the frequency $f_{1M}$ is extracted by the band-pass filter 224, the signal component is amplified by the amplifier 225 and is demodulated by the demodulator 226. The demodulated data signal is then supplied to the arithmetic unit 21. When the data stored in the accumulator 10 is supplied to the arithmetic unit 21 in this manner, the data is displayed on the display unit 24 and is stored in the storage unit 26.

As described above, in the present invention, the transmission/reception section 12 is arranged in the accumulator 10 to transmit accumulated data to the hand-held/portable terminal 20. Note that the transmission/reception section 12 of the accumulator 10 is operated only in response to the start signal b from the hand-held/portable terminal 20 but is normally kept in a standby state to reduce power consumption. Therefore, the addition of such a function to the accumulator 10 only slightly increases the power consumption. That is, the present invention can be easily applied to various types of accumulators using batteries and the like.

Figure 4B:
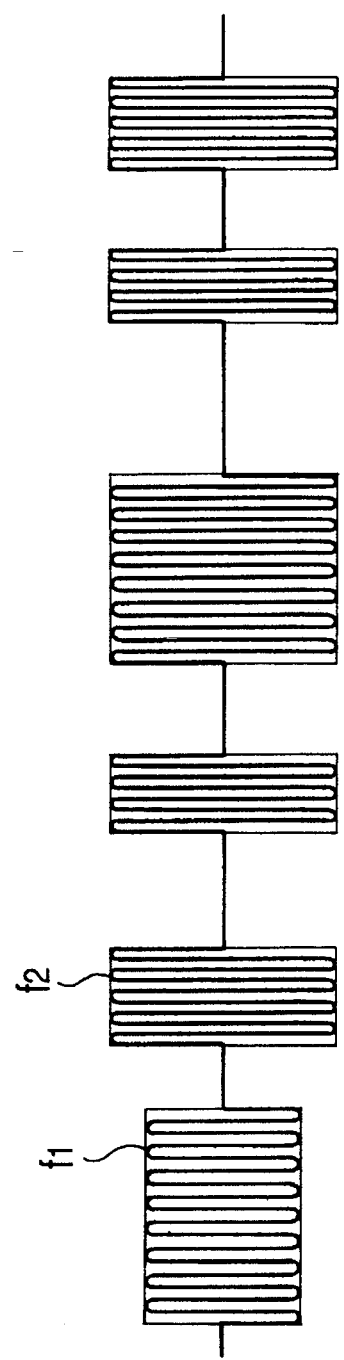

In this embodiment, although a carrier is shaped into the clock signal a on the accumulator 10 side, an oscillator may be arranged in the accumulator 10 so that a signal at a frequency $f_2$, as shown in FIG. 4B, which is different from the transmission signal at the frequency $f_1$, transmitted from the hand-held/portable terminal 20, may be transmitted to the hand-held/portable terminal 20. In this case, unlike the case described above, energy is required for transmission from the accumulator 10. However, the communication distance between the accumulator 10 and the hand-held/portable terminal 20 can be set to be a relatively large value, i.e., about fifty cm, if the required energy is supplied.

The antenna coil used in the accumulator 10 in this embodiment is a simple coil with or without a core, having a diameter of several cm. In this case, since the strength of an electromagnetic field generated by the antenna coil is inversely proportional to the square of the distance from the antenna, even if another accumulator is arranged at a distant place, an electromagnetic field from this accumulator is weak, so that no interference is caused between the accumulators.

In addition, an ID code may be stored in the internal memory 16 of the arithmetic unit 11 of each accumulator 10. In this case, if the ID code of the accumulator 10 is transmitted, in addition to the above-mentioned accumulation data, from the accumulator 10, which has received a data request signal, and the ID code is checked by using an ID code stored in the internal memory 27 or the storage unit 26 on the hand-held/portable terminal 20 side, it can be checked whether the received accumulation data is from the target accumulator. With this operation, the reliability of the accumulation data is improved. In the storage unit 26, the ID numbers corresponding to the respective accumulators are stored along with their corresponding previously read accumulation value.

Both the ID code and the previously read value, which are received from the accumulator recently (i.e., new data) are compared with what was copied from the storage unit to the second memory of the hand-held terminal. With this operation, the reliability of reading the accumulation data is improved. When the above data coincide with each other respectively, the value in the storage unit of the "hand-held" terminal is overwritten by the recent data value (i.e., the new value of the meter accumulator.

If another accumulator is arranged adjacent to the accumulator 10, a mechanism for reducing the transmission power of the hand-held/portable terminal 20, e.g., an attenuator, may be arranged in the transmission/reception section 22, or the reception sensitivity of the accumulator 10, e.g., the sensitivity of the comparator 124 in the transmission/reception section 12, may be reduced to prevent interference.

Furthermore, the ID code of a target accumulator may be transmitted from the hand-held/portable terminal 20 so that only the corresponding accumulator, of accumulators respectively storing their ID codes in the internal memories in the above-described manner, responds to the request. Instead of using an ID code, a previously read accumulation value may be used. More specifically, a previously read accumulation value is stored in the internal memories 16 and 27 of the accumulator 10 and the hand-held/portable terminal 20, and the stored values are used as collation data in the next read operation. With this operation, the same effect as that described above can be obtained. If ID codes or previously read accumulation values are used in the above-described manner, the ID data of the accumulator 10 is stored in the internal memory 16, and at the same time the ID data of all accumulators from which data are to be read are stored in the internal memory 27 of the hand-held/portable terminal 20. External memories may be used in place of the internal memories 16 and 27. In the hand-held/portable terminal 20, instead of storing data in the internal memory 27, necessary data such as an ID code may be input from the operating section 25.

What is claimed is:

1. A remote data reading system comprising:

at least one accumulator for accumulating data representing an amount under measurement; wherein each accumulator includes first transmission/reception means of an electromagnetic induction type for receiving a data request signal, and for sending data in response to the data request signal;

wherein each of the accumulators further includes a first memory adapted for storing an accumulated amount, an accumulated identification code, and a previously read accumulation amount;

wherein each of the accumulators transmits the accumulated amount, the accumulator identification code, and the previously read accumulation amount together in response to the data request signal; and a portable, hand-held terminal for reading and displaying data from the accumulator, the hand-held terminal second transmission/reception means of an electro magnetic induction type for sending the data request signal to the first transmission/reception means, and for receiving the data from the first transmission/reception means;

wherein the hand-held terminal further includes a second memory adapted for storing the accumulated identification code, unique to each accumulator, for identifying each of the accumulators and adapted for storing the previously read accumulated amount for each accumulator.

wherein the hand-held terminal is adapted to check on the basis of the received accumulator identification code and the previously read accumulated amount whether the received data is from a target accumulator;

wherein the hand-held terminal transmits the data request signal including the accumulator identification code of a target accumulator and the previously read accumulated amount of the target accumulator, wherein each of the accumulators updates/stores the accumulated amount data transmitted to the hand-held terminal as a new accumulated identification code, in the first memory, and the hand-held terminal reads the accumulated amount from the target accumulator in a next read operation by using the accumulated amount data stored in the first memory.

2. System according to claim 1 wherein said hand-held terminal comprises means for reducing transmission power to prevent interference when said accumulators are arranged adjacent to each other.

3. A remote data reading system comprising:

at least one accumulator for accumulating data representing an amount under measurement; wherein each accumulator including first transmission/reception means of an electromagnetic induction type for receiving a data request signal, and for sending data in response to the data request signal;

wherein each of the accumulators further includes a first memory adapted for storing an accumulated amount, an accumulated identification code, and a previously read accumulation amount;

wherein each of the accumulators transmits the accumulated amount, the accumulator identification code, and the previously read accumulation amount together in response to the data request signal; and a portable, hand-held terminal for reading and displaying data from the accumulator, the hand-held terminal second transmission/reception means of an electro magnetic induction type for sending the data request signal to the first transmission/reception means, and for receiving the data from the first transmission/reception means;

wherein the hand-held terminal further includes a second memory adapted for storing the accumulated identification code, unique to each accumulator, for identifying each of the accumulators and adapted for storing the previously read accumulated amount for each accumulator, wherein the hand-held terminal transmits the data request signal including the accumulator identification code of a target accumulator and the previously read accumulated amount of the target accumulator, wherein the accumulator in which the accumulator identification code and the previously read accumulated amount coinciding with the transmitted accumulator identification code and transmitted previously read accumulated amount are stored in the first memory, responds to the data request signal and transmits the data;

wherein each of the accumulators updates/stores the accumulated amount data transmitted to the hand-held terminal as a new accumulated identification code, in the first memory, and the hand-held terminal reads the accumulated amount from the target accumulator in a next read operation by using the accumulated amount data stored in the first memory.

4. System according to claim 3 wherein said hand-held terminal comprises means for reducing transmission power to prevent interference when said accumulators are arranged adjacent to each other.

* * * * *